(12) United States Patent
Skarby et al.

(10) Patent No.: US 8,064,958 B2
(45) Date of Patent: Nov. 22, 2011

(54) METHOD DEVICE BASE STATION AND SITE FOR REDUCING THE NUMBER OF FEEDERS IN AN ANTENNA DIVERSITY DIVERSITY SYSTEM

(75) Inventors: Ulf Skarby, Lidingo (SE); Bo Hedberg, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 19 days.

(21) Appl. No.: 10/598,678

(22) PCT Filed: Mar. 11, 2004

(86) PCT No.: PCT/SE2004/000359
§ 371 (c)(1),
(2), (4) Date: Sep. 7, 2006

(87) PCT Pub. No.: WO2005/088764
PCT Pub. Date: Sep. 22, 2005

(65) Prior Publication Data
US 2007/0191064 A1    Aug. 16, 2007

(51) Int. Cl.
*H04M 1/00*    (2006.01)
(52) U.S. Cl. ............... 455/562.1; 455/67.1; 455/561; 455/572
(58) Field of Classification Search ............ 455/562.1, 455/21, 19, 24, 20, 10, 11.1, 13.1, 13.3, 118
See application file for complete search history.

(56) References Cited

U.S. PATENT DOCUMENTS

| | | | | |
|---|---|---|---|---|
| 4,563,774 A | * | 1/1986 | Gloge | 398/166 |
| 4,649,549 A | * | 3/1987 | Halpern et al. | 380/32 |
| 4,748,682 A | * | 5/1988 | Fukae et al. | 455/137 |
| 5,067,173 A | * | 11/1991 | Gordon et al. | 398/116 |
| 5,216,434 A | * | 6/1993 | Fukumura | 343/876 |
| 5,248,988 A | * | 9/1993 | Makino | 343/792 |
| 5,280,472 A | * | 1/1994 | Gilhousen et al. | 370/335 |
| 5,408,495 A | | 4/1995 | Kotzin et al. | |
| 5,444,745 A | * | 8/1995 | Ali-Vehmas | 375/347 |
| 5,513,176 A | * | 4/1996 | Dean et al. | 370/335 |
| 5,533,011 A | * | 7/1996 | Dean et al. | 370/342 |

(Continued)

FOREIGN PATENT DOCUMENTS

EP    0 684 707    11/1995

(Continued)

OTHER PUBLICATIONS

Swedish Patent Office, International Search Report for PCT/SE2004/000359, dated Sep. 30, 2004.

(Continued)

*Primary Examiner* — Duc Nguyen
*Assistant Examiner* — Ajibola Akinyemi
(74) *Attorney, Agent, or Firm* — Nixon & Vanderhye P.C.

(57) ABSTRACT

A method, device and system for reducing the number of feeders (2, 3) between a radio base station (1) and an antenna diversity arrangement (10, 11, 12, 13) at which RF signals of the same frequency are received. In a tower mounted amplifier (45) individual RF signals from some or all of the antennas are frequency converted into intermediate frequency (IF) signals on mutually different intermediate frequencies which are combined and forwarded to the radio base station on a reduced number of feeders. In the radio base station the combined signal is split into individual signals amongst which the IF signals are frequency transformed to a signal suitable for diversity processing.

21 Claims, 7 Drawing Sheets

U.S. PATENT DOCUMENTS

| | | | |
|---|---|---|---|
| 5,742,583 A * | 4/1998 | Scott | 370/342 |
| 5,844,632 A * | 12/1998 | Kishigami et al. | 348/706 |
| 5,859,842 A * | 1/1999 | Scott | 370/342 |
| 5,926,503 A * | 7/1999 | Kelton et al. | 375/148 |
| 5,963,874 A * | 10/1999 | Mahler | 455/562.1 |
| 6,047,199 A * | 4/2000 | DeMarco | 455/572 |
| 6,049,310 A * | 4/2000 | Sadahiro | 343/702 |
| 6,104,356 A * | 8/2000 | Hikuma et al. | 343/853 |
| 6,252,507 B1* | 6/2001 | Gagnon | 340/552 |
| 6,339,703 B1* | 1/2002 | Otsuka | 455/276.1 |
| 6,522,307 B2* | 2/2003 | Kim | 343/850 |
| 6,522,642 B1* | 2/2003 | Scott | 370/342 |
| 6,557,879 B2 | 5/2003 | Caldwell | |
| 6,571,110 B1* | 5/2003 | Patton et al. | 455/561 |
| 6,621,469 B2* | 9/2003 | Judd et al. | 343/853 |
| 6,868,254 B2* | 3/2005 | Weissman | 455/11.1 |
| 6,870,515 B2* | 3/2005 | Kitchener et al. | 343/853 |
| 7,054,397 B1* | 5/2006 | Kawanabe | 375/347 |
| 7,069,053 B2* | 6/2006 | Johannisson et al. | 455/562.1 |
| 7,123,939 B1* | 10/2006 | Bird et al. | 455/561 |
| 7,181,243 B1* | 2/2007 | Nicholls et al. | 455/561 |
| 7,257,369 B2* | 8/2007 | Weissman | 455/11.1 |
| 7,272,417 B2* | 9/2007 | Mostafa et al. | 455/562.1 |
| 2001/0044323 A1* | 11/2001 | Waylett | 455/561 |
| 2002/0009982 A1* | 1/2002 | Kim | 455/135 |
| 2002/0016152 A1* | 2/2002 | Weissman et al. | 455/16 |
| 2003/0139198 A1* | 7/2003 | Johannisson et al. | 455/525 |
| 2004/0125741 A1* | 7/2004 | Demoulin et al. | 370/208 |
| 2004/0214608 A1* | 10/2004 | Mostafa et al. | 455/562.1 |
| 2005/0215288 A1* | 9/2005 | Beaudin et al. | 455/562.1 |
| 2005/0277387 A1* | 12/2005 | Kojima et al. | 455/78 |
| 2006/0003808 A1* | 1/2006 | Haskell et al. | 455/562.1 |
| 2006/0111041 A1* | 5/2006 | Karabinis | 455/13.4 |
| 2007/0058761 A1* | 3/2007 | Lindenmeier | 375/347 |
| 2007/0135169 A1* | 6/2007 | Sychaleun et al. | 455/562.1 |
| 2007/0173288 A1* | 7/2007 | Skarby et al. | 455/561 |
| 2008/0026796 A1* | 1/2008 | Thomas | 455/562.1 |
| 2008/0119197 A1* | 5/2008 | Skarby | 455/446 |
| 2008/0287163 A1* | 11/2008 | Skarby et al. | 455/562.1 |

FOREIGN PATENT DOCUMENTS

| | | | |
|---|---|---|---|
| EP | 1 100 212 | | 5/2001 |
| JP | 02-260925 | | 10/1990 |
| JP | 06-077865 | | 3/1994 |
| JP | 07-336294 | | 12/1995 |
| JP | 08-046541 | | 2/1996 |
| JP | 10-509848 | | 9/1998 |
| JP | 11-122131 | | 4/1999 |
| JP | 11-298944 | | 10/1999 |
| JP | 2003-513569 | | 4/2003 |
| JP | 2003-274296 | | 9/2003 |
| WO | WO99/26317 | * | 5/1999 |
| WO | WO 99/26317 | | 5/1999 |
| WO | WO 9926317 A1 | | 5/1999 |
| WO | WO 01/33876 | | 5/2001 |

OTHER PUBLICATIONS

Translation of Chinese official action, Dec. 11, 2009, in corresponding Chinese application No. 200480042369.
Translation of Japanese official action, Oct. 2, 2009, in corresponding Japanese Application No. JP 2007-502751.
Office Action mailed Sep. 10, 2010 in co-pending U.S. Appl. No. 11/629,069.
International Search Report for International Application No. PCT/SE2004/000942 mailed Feb. 2, 2005.
Summary of Japanese official action, Nov. 13, 2009, in corresponding Japanese Application No. 2007-516420.
Swedish Patent Office, International Search Report for PCT/SE2004/000359, dated Sep. 30, 2004.
International Preliminary Report on Patentability for PCT/SE2004/000359, dated Mar. 1, 2006.
Office Action mailed Aug. 1, 2011 in co-pending U.S. Appl. No. 11/629,069.
Canadian official action, May 18, 2011, in corresponding Canadian Application No. 2,570,166.
English Translation of Chinese official action, Jun. 2, 2011, in Chinese Application No. 200480043817.1.

* cited by examiner

METHOD DEVICE BASE STATION AND SITE FOR REDUCING THE NUMBER OF FEEDERS IN AN ANTENNA DIVERSITY DIVERSITY SYSTEM

TECHNICAL FIELD OF THE INVENTION

The invention generally relates to tower-mounted amplifiers (TMA) and antenna diversity. In particular the invention relates to a method and arrangement for reducing the number of feeders from an antenna diversity system to a radio base station.

DESCRIPTION OF RELATED ART

Antenna diversity is used in order to improve reception (or transmission) of transmitted radio signals. There are many kinds of diversity, such as time diversity, space diversity, polarisation diversity and combinations thereof. Space and polarisation diversity reduces the effects of fading received radio signals.

An antenna diversity systems comprises at least two antennas arranged at a distance from each other or with different polarisation. In case of receive diversity the signal (RX signal) from a distant transmitter is received on the two or more antennas. In case of transmitter diversity the transmit signal (TX signal) is transmitted on the two or more transmit antennas to which the transmitter is connected. In the following the antennas of a diversity arrangement are called diversity antennas. It is possible to send and receive on the same antenna by connecting a duplex filter to the antenna, the duplex filter separating the TX and RX signals from each other. Signals are transported between an antenna and a transceiver (TRX) on a feeder. In prior art diversity arrangements a feeder and its associated antenna is referred to as a diversity branch or simply branch. In the context of the present invention a diversity branch comprises a diversity antenna and the devices the signal received on this antenna passes.

In the following diversity in connection with reception will be discussed. The RX signals from the diversity antennas are subjected to diversity processing in order to obtain an enhanced signal. Diversity processing may for example be to select the antenna signal which is strongest, or to add the signals and further process the resulting signal.

Each RF signal received at an diversity antenna arrangement is connected to respective tower-mounted amplifiers (TMAs) from which the amplified signal is transported in an individual diversity branch containing a feeder, typically a coaxial cable, which is connected to a transceiver TRX in the radio base station. Several branches are connected to one TRX. The TRX may be provided with a diversity receiver for demodulation and diversity signal processing.

A tower mounted unit is sometimes called a mast head amplifier. It should be noted that these units need not be mounted in a tower, but may be mounted on poles, walls of buildings, building roofs etc. The same goes for the diversity antennas. The invention is therefore not restricted to amplifiers mounted in towers. A tower mounted amplifier (TMA) is just a name under which a device of this kind is known to the man skilled in the art.

Figure 1:
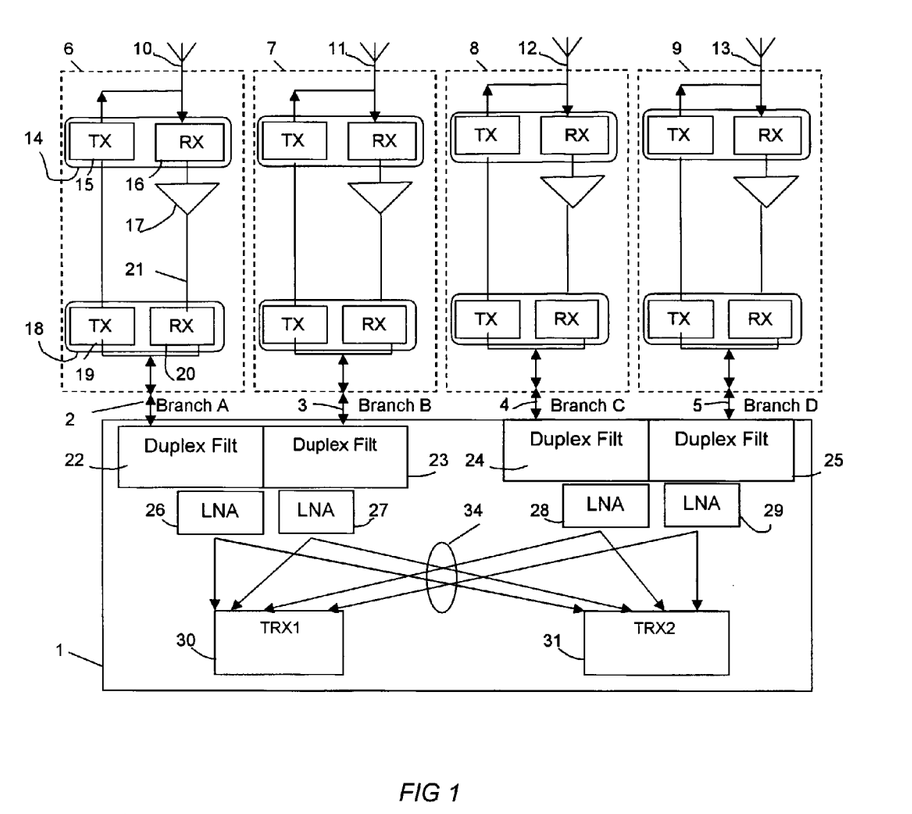
FIG. 1. is a block diagram of a prior art 4 way diversity system

FIG. 1 discloses a prior art site comprising a radio base station (RBS) 1, feeders 2-5 extending between the radio base station and TMAs 6-9. Each TMA is connected to a respective diversity antenna 10-13. The TMAs are all identical and in the following reference is therefore only made to TMA 6. The antenna 10 is connected to a duplex filter 14 comprising a transmitter part (TX) 15 and a receiver part (RX) 16. An RF amplifier 17 amplifies the received filtered RX signal and supplies it to another duplex filter 18 which comprises a transmitter part (TX) 19 and a receiver part (RX) 20. receiver part (RX) 20. The function of a duplex filter is to separate the TX signal from the RX signal and prevent the TX signal from leaking over into the receiving chain 21. Signals received on antenna 10, 11, 12 and 13 respectively and processed in TMA 6, 7, 8 and 9 respectively follow a diversity branch A, B, C and D respectively.

The radio base station 1 comprises duplex filters 22-25 and low noise amplifiers 26-29 (LNA), one for each TMA. The heart of the radio base station is the transceiver units 30, 31 (TRX1, TRX2). Depending on the capabilities a transceiver has and the traffic capacity a radio base station is designed for, there may be just one TRX or many more transceivers than the two shown.

The arrangement shown in FIG. 1 is called 4 way diversity with 4 feeders.

Figure 2:
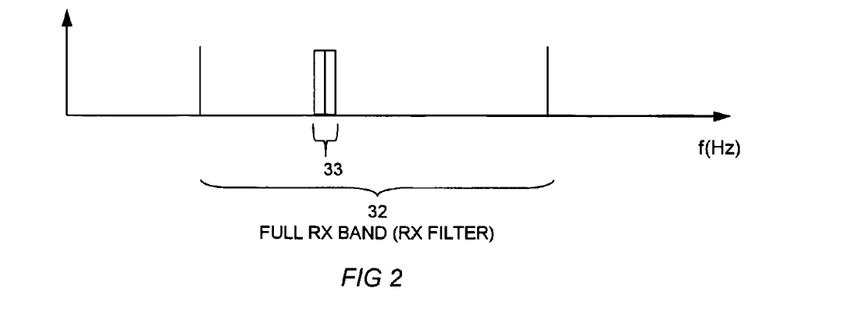
FIG. 2. is a frequency diagram illustrating the prior art diversity system of FIG. 1, FIG. 3. is a block diagram of a first embodiment of a 4 way diversity system in accordance with the invention, FIG. 4. is a frequency diagram illustrating the first embodiment of the invention, FIG. 5. is a block diagram of a second embodiment of a 4 way diversity system in accordance with the invention, and FIG. 6. is a frequency diagram illustrating the second embodiment of the invention, FIG. 7. is a block diagram of a third embodiment of the invention, FIG. 8. is a frequency diagram illustrating the third embodiment of the invention, FIG. 9. is a modification of the first embodiment, FIG. 10. is a frequency diagram associated with modification in FIG. 9, FIG. 11. is a block diagram of a fourth embodiment of the invention, FIG. 12. is a frequency diagram illustrating the fourth embodiment, FIG. 13. is a block diagram of a fifth embodiment comprising a separate frequency converter unit, and FIG. 14. is a frequency diagram associated with the frequency converter unit.

In FIG. 2 a frequency spectrum illustrating the range of frequencies that can pass through the RX filter 22, this range being the full RX band 32 allotted the service. The radio channel on which the RX signal to a transceiver is received and the TX signal is transmitted from the same transceiver is called a user channel. Since there are two transceivers shown in FIG. 2 there are two user channels, each shown with a small rectangle. The frequency band the user channels occupy is called a user band and this is indicated at brace 33. In each one of the four branches a respective user band is present and it is the same (in terms of kHz) in all branches. A feeder, however, is capable to transport signals on all the frequencies up to several GHz including the full RX band 32. It is thus apparent that the feeder in each branch is utilized with poor efficiency.

In principle one TRX is sufficient to diversity process the four RX signals and obtain the enhanced RX signal. A radio base station is however designed to handle large traffic volumes and therefore, and also for safety reasons, it comprises many TRXes. The output of each LNA is for this reason connected to all transceivers of the radio base station, as is shown by the various arrows, collectively shown at 34.

U.S. Pat. No. 6,505,014 discloses a base station with an antenna diversity system connected to a multi coupler from which the antenna signals are fed to the respective receivers in individual feeders.

A drawback with the prior art is that each branch requires its own feeder. A diversity antenna system with many antennas will thus require as many feeders as there are antennas. Feeders are expensive. They are also heavy. Antennas are less expensive. Therefore, systems comprising many diversity antennas are prohibitive from economical point of view although they would be beneficial from reception quality point of view.

SUMMARY OF THE INVENTION

One object of the invention is to reduce the number of feeders compared with prior art and provide a method device, radio base station and system in accordance with claims 1, 7, 11 and 12.

A characteristic feature of the invention is to move/frequency translate an RX signal received on one diversity antenna to a non used frequency and to consolidate/combine the frequency translated signal with an RX signal, that has not been frequency translated, and to forward the resulting composite signal on a single feeder to the radio base station.

Depending on the radio system in which the invention is used the meaning of "frequency" and "signal frequency" may be different. A preferred implementation of the invention is cellular mobile radio systems such as WCDMA, GSM, AMPS, NMT. The bandwidth of an WCDMA signal is 5 MHz, in GSM 200 kHz, in AMPS 30 kHz and in NMT 25 kHz. It is the signal with these respective bandwidths that is frequency translated to another non-used (by this RBS) part of the frequency band. In WCDMA the 5 MHz signal comprises voice and/or data from several users, in the GSM system the 200 kHz signal comprises voice and/or data from up to eight (8) users, in AMPS and NMT the 30 and 25 kHz signals comprise voice and/or data from one (1) user. Thus, in practice, the signal frequency is a frequency band.

DETAILED DESCRIPTION OF EMBODIMENTS

Figure 3:
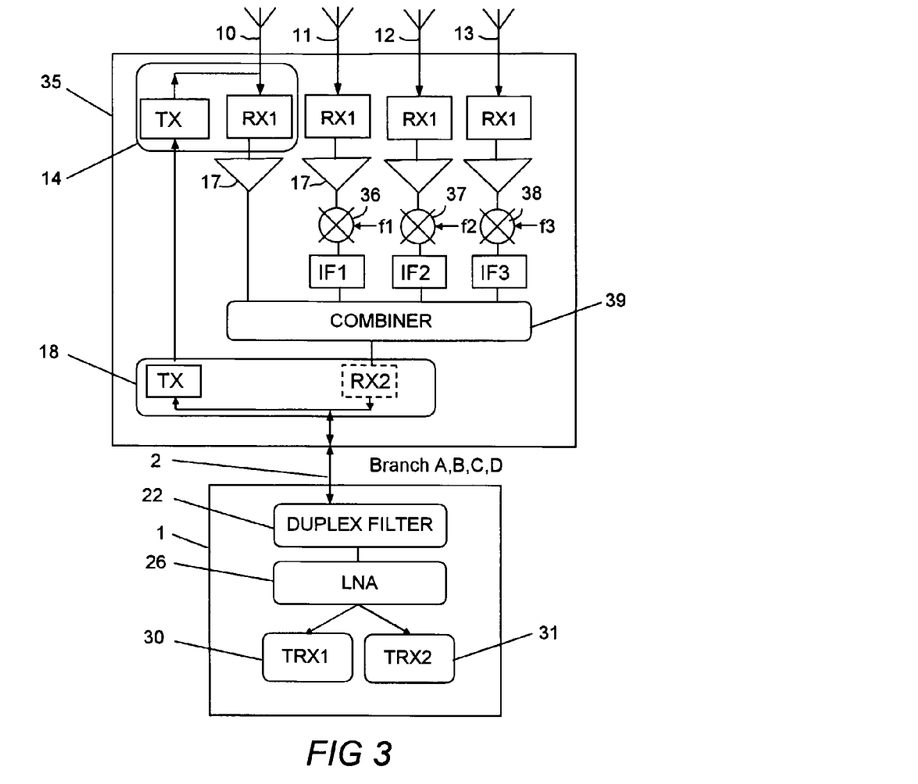

FIG. 3 illustrates an embodiment of the invention. Elements similar to those in FIGS. 1 and 2 bear the same reference designations. A novel tower mounted amplifier 35 comprises frequency converters 36, 37, 38, each one connected to a respective antenna 11, 12 and 13 in order to move the frequency of the received RF antenna signal to a respective non-used frequency by mixing the RF antenna signal with a respective reference signal f1, f2, and f3 of a predetermined frequency. The signal received on antenna 10 is not moved in frequency. The reference signal may be a continuous wave signal, CW signal, a signal from a local oscillator or any equivalent.

The reference signal does not occupy a frequency band. Accordingly, the signal definition given above does not apply to the reference signal. A frequency converter is a device which as input receive the RX antenna signal and mixes it with the reference signal in order to obtain a frequency translated signal on an intermediate frequency (IF). The output of each frequency converter is connected to a respective band pass filter IF1, IF2 and IF3. The amplified non-converted, original, radio signal received on antenna 10 in diversity branch A, and each IF signal in the respective branches B, C and D enters a combiner 39 wherein they are combined into a composite signal which is passed to a band pass filter RX2 in duplex filter 18. The duplex filter is connected to feeder 2. Accordingly the composite signal comprising the signals in the respective diversity branches A-D is forwarded to the radio base station 1 on a single feeder.

Filter IF1 prevents IF signals from converters 37 and 38 to leak into diversity branch B. Filters IF2 and IF3 have similar functions.

Figure 4:
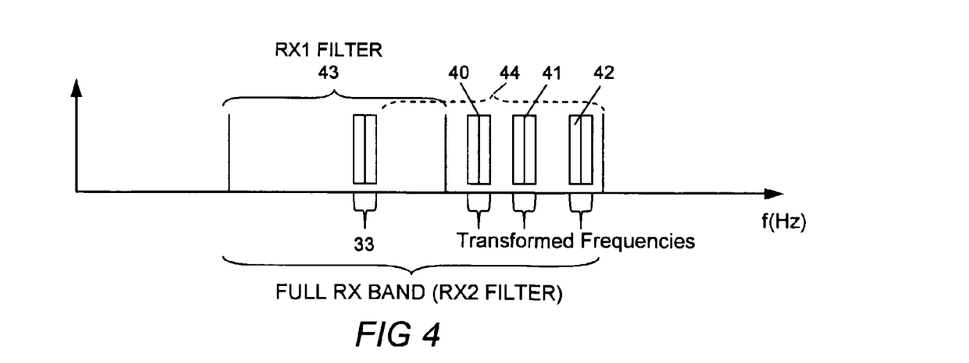

FIG. 4 is associated with FIG. 3 and is a frequency spectrum illustrating signals at different locations in the TMA and in the feeder. The user band is shown at 33 and the three intermediate frequencies are shown at 40, 41 and 42. This time the feeder is utilized with three times the efficiency provided with the prior art arrangement shown in FIGS. 1 and 2.

In the shown embodiment the received radio signals are up converted to IF frequencies above the user band 33. The IF frequencies are mutually different, i.e. the three IF signals at the output of the frequency converters lie at different IF frequencies.

The frequency range passed by filters RX1 is shown at 43. The frequency range passed by filter RX2 is denoted the full RX band. Note that the IF frequencies must fall within a non-used part of the full RX band. In the shown embodiment the up converted IF signals should fall to the right of the frequency range 43 passed by filters RX1. In a situation where the frequency range 43 falls more to the right in FIG. 4, as shown by the dashed brace 44 the IF signals should fall to the left of the dashed brace in order not to interfere with the user band 33. The RX signals are thus down converted to an IF below the user band 33. Situations may occur in which the IF signals fall on either side of the user band.

The arrangement in FIG. 3 provides 4 way diversity with 1 feeder.

At the radio base station the signals carried by the feeder pass the duplex filter 22, the low noise amplifier 26 and enter the transceiver 30 in which they are split into four RX chains. The signals associated with diversity branches B, C and D are frequency converted. The signals in each of the diversity branches A-D are subjected to diversity processing. Diversity processing may take place in a diversity receiver.

Figure 5:
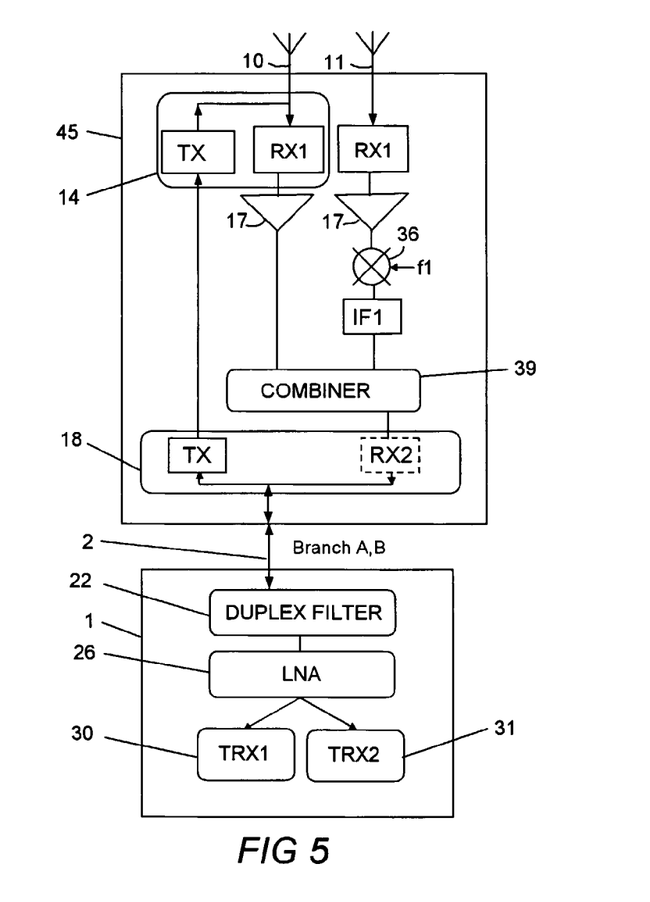
Figure 6:
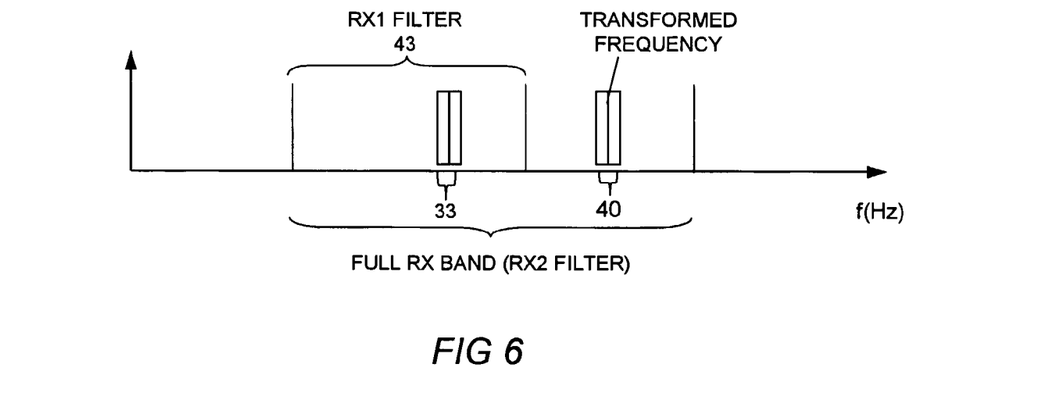

The arrangement shown in FIG. 5 is similar to FIG. 3, but this time the tower mounted amplifier 45 comprises only one frequency converter 36. In combiner 39 the original signal in diversity branch A is combined with the IF signal in branch B into a composite signal which is forwarded to the radio base station on the single feeder 2. This arrangement provides 2 way diversity with 1 feeder. The frequency spectrum in the single feeder 2 is shown in FIG. 6.

Figure 7:
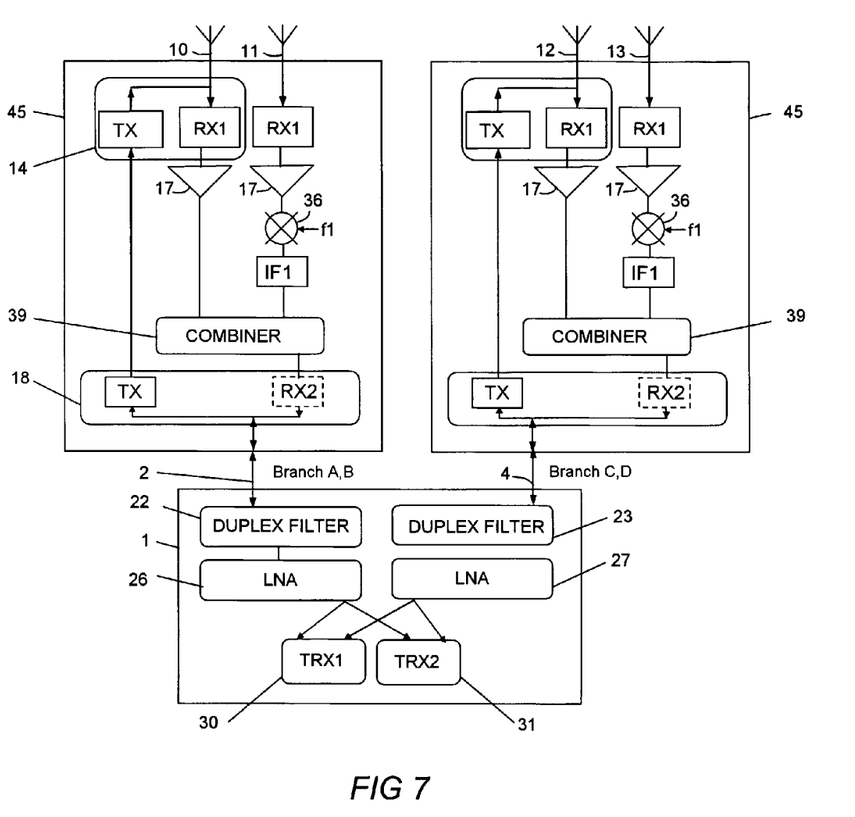
Figure 8:
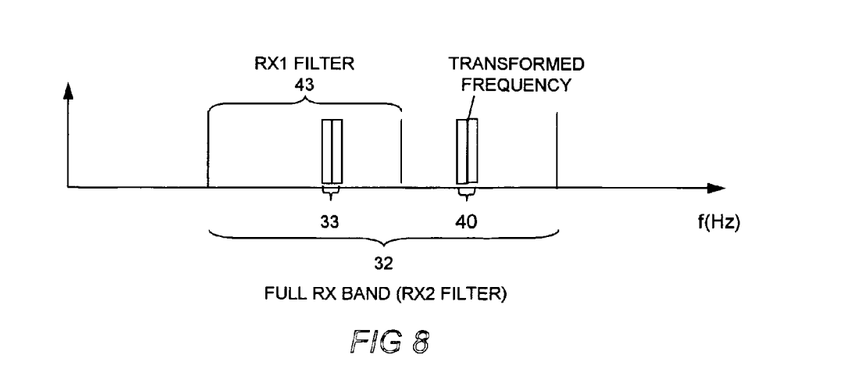

An arrangement providing 4 way diversity with 2 feeders is shown in FIG. 7. This arrangement is achieved by doubling the arrangement shown in FIG. 5 and uses two TMAs 45. The feeders 2, 4 from the two TMAs are connected to a respective duplex filter in the radio base station. As indicated above it is in principle possible to use one TRX only, but in practice the radio base station comprises several transceivers. It should be understood that both feeders 2 and 4 carry the same two user bands 33 and the same intermediary frequencies 40-42 The frequency diagram shown in FIG. 8 is thus identical for the two feeders.

An advantage with the TMA embodiments in which the direct antenna signal is consolidated with the IF signals and the resulting composite signal is forwarded on a single feeder to the radio base station is that the existing radio base stations need not be modified, since they already comprise frequency converters by which the IF signals plus the direct RF signals are transformed into the second IF frequency.

With the arrangement in accordance with the invention is achieved that the diversity signals are forwarded to the radio base station on a reduced number of feeders as compared to prior art where there are as many feeders as diversity antennas and each diversity signal is forwarded on a feeder of its own.

Figure 9:
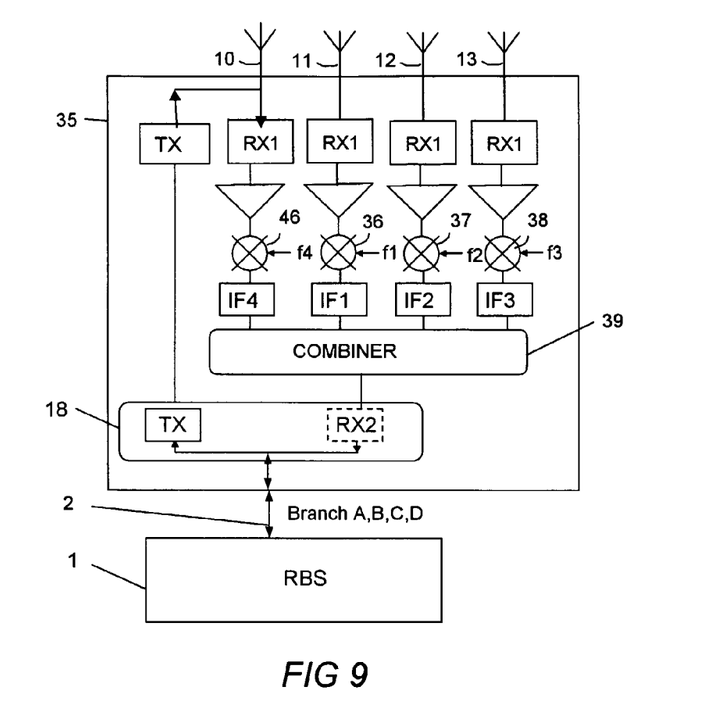
Figure 10:
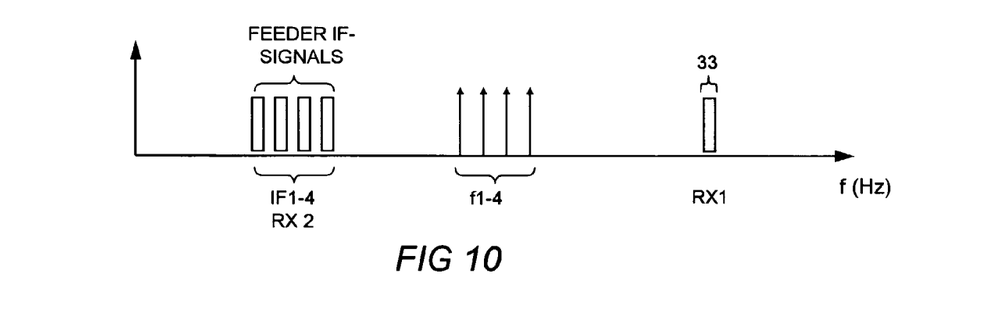

FIG. 9 illustrates a modification of the embodiment shown in FIG. 3 wherein all antenna signals are frequency converted. An additional frequency converter 46 is used and is inserted in diversity branch A of antenna 10. In this embodiment four IF signals are consolidated into composite signal which is forwarded to the radio base station on the single feeder 2. This provides 4 way diversity on 1 feeder. In this embodiment the radio base station comprises only one duplex filter, one low noise amplifier and one transceiver, although this has not been shown in the drawing. Since only one transceiver is used, only one user channel is used on the user band and therefore there no double rectangles are shown in the frequency diagram in FIG. 10. In this embodiment the signals passed by filters RX1 may be on a level of some GHz ($10^9$), and the IF signals on the feeder on a level of some MHz ($10^7$). The reference frequencies f1-f4 fall in a frequency range in-between.

A modification of the arrangements shown in FIGS. 5 and 7 is to frequency convert all diversity antenna signals and use an additional frequency converter similar to frequency converter 46 in the embodiment of FIG. 9.

Figure 11:
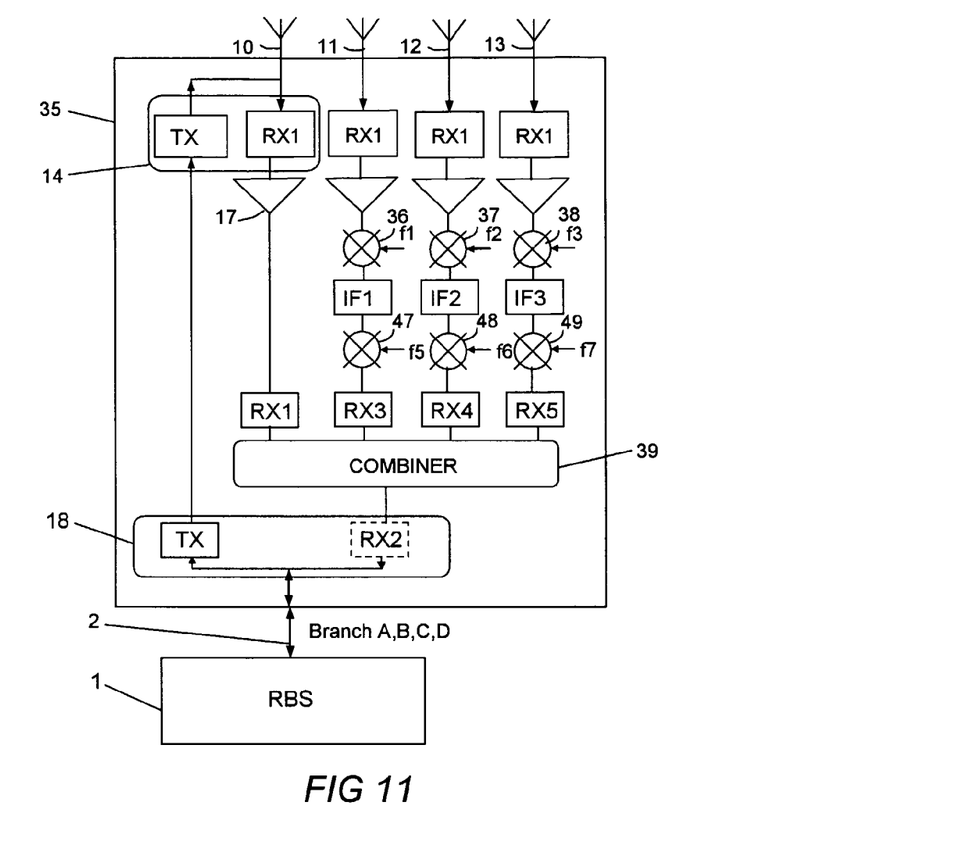

In FIG. 11 the RX signals the signals on antennas 11, 12 and 13 are subjected to a first frequency translation in frequency converters 36, 37, 38 (f1, f2, f3 could be on the same frequency, but in that case f5, f6, f7 must have different frequencies) which are connected to filters IF1, IF2 and IF3. The RX signal on antenna 10, however, is not subjected to any frequency translation in the TMA. A feature of the FIG. 11 embodiment is that the frequency translated IF signals on the outputs of filters IF1, IF2 and IF3 are subjected to a second frequency translation in frequency converters 47, 48, 49 by mixing them with a second set of reference signals f5, f6 and f7 and filter the resulting signals in IF filters RX3, RX4 and RX5 connected to the frequency converters 47-49. The direct, original, antenna signal passes filter RX1 in the duplex filter 14, the low noise amplifier 17 and a second filter RX1, similar to RX1 in the duplex filter 14 and is combined, in combiner 39, with the twice frequency converted signals at the output of filters RX3-RX5. The composite signal in all diversity branches is forwarded on the single feeder 2 to the radio base station.

Figure 12:
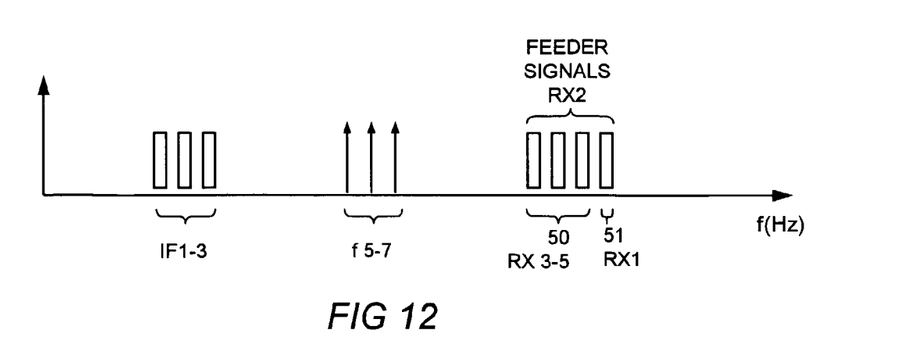

The reference signals f5-f7 are so selected that the signals at the output of filters RX3-RX5 fall on frequencies, shown at brace 50 in FIG. 12, adjacent to the frequency, shown at brace 51, of the filtered direct signal. This embodiment allows for use of SAW (surface acoustic wave) filters IF1-IF4 with steep characteristics and accurate pass band frequencies.

Figure 13:
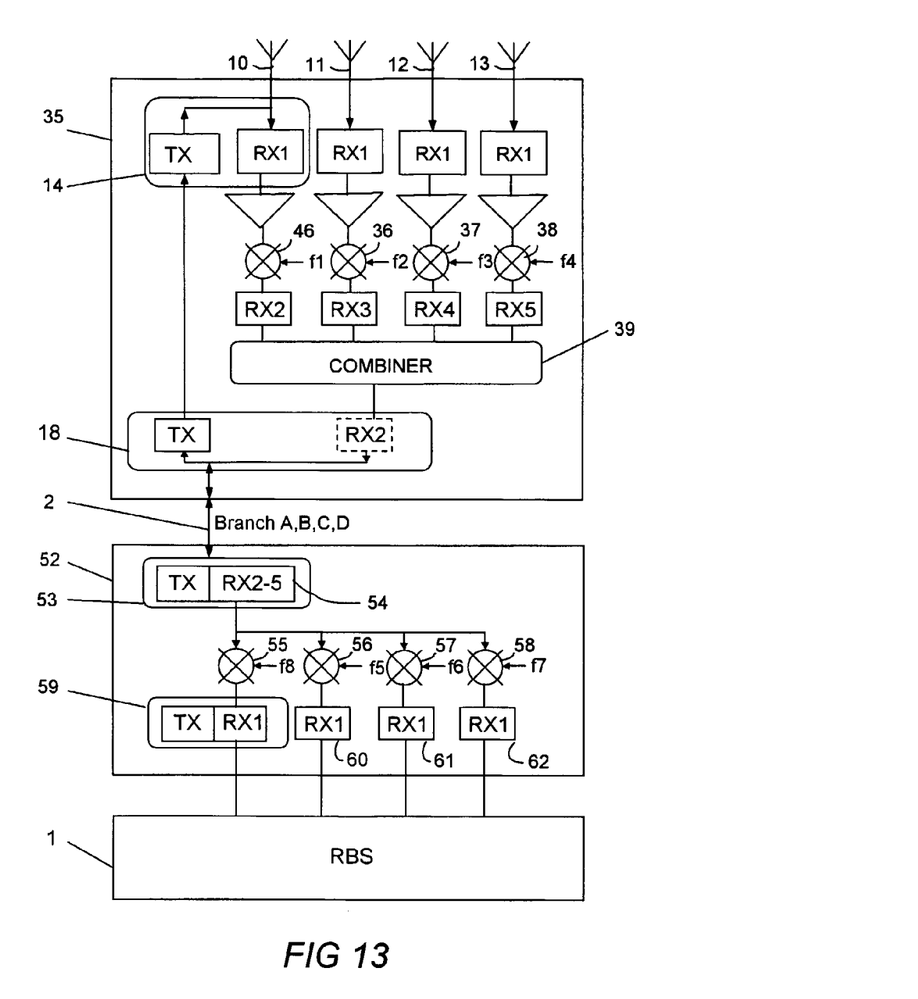

FIG. 13 illustrates an embodiment comprising a frequency converter unit 52 connected between the tower-mounted amplifier 35 and the radio base station 1. The frequency converter unit is used together with radio base stations that do not have a sufficient amount of frequency converters to frequency convert the split up signals into one and the same frequency so as to provide for diversity processing of the split up signals.

In FIG. 13 the TMA 35 is similar to the one shown in FIG. 9 but the notations used for filters and reference frequencies differ. The composite signal comprising the IF signals on the different IF frequencies are fed to the frequency converter unit 52 on the single feeder 2.

The frequency converter unit 52 comprises a duplex filter 53 with a filter TX and a filter 54 (RX2-5). The duplex filter is connected to frequency converters 55-58 of which 55 is connected to a duplex filter 59 and 56-58 are connected to a respective filter 60-62. The RX filter of the duplex filter 59 and filters 60-62 are all similar to filters RX1 in TMA 35. The reference signals f5-f8 are selected so that the resulting frequency converted signals at the outputs of the frequency converters 55-58 all are of the same frequency. The filtered frequency converted signals appear at the outputs of the frequency converter unit and are adapted for diversity processing.

Figure 14:
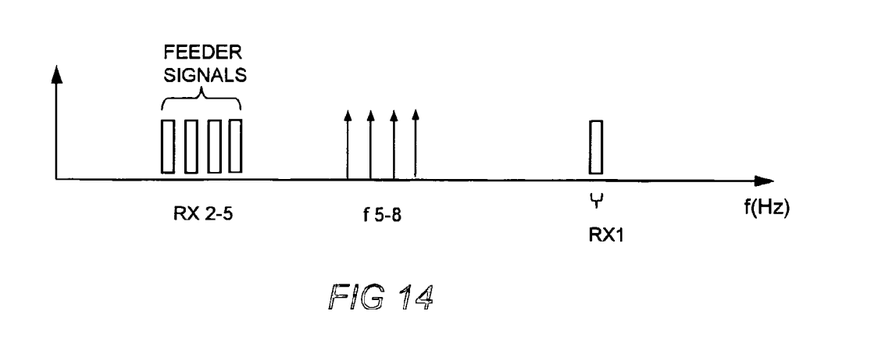

A frequency diagram of the signals appearing in the feeder and the frequency converter unit 52 is shown in FIG. 14. The frequency diagram for the composite signal in feeder 2 is the same as the one shown in FIG. 9. Note that the RX1 signal in the diagram illustrates the four output signals from the frequency converter unit.

Although not shown in the drawings it should be understood that a non-shown noise reducing filter is inserted after the low noise amplifier 17 in diversity branch A, that is the branch carrying the original, non-frequency translated RX signal.

In many of the above described embodiments of the invention the filter RX2 and RX2-5 respectively may be omitted provided the RX 2-RX 5 filters at the outputs of the frequency converters prevent their respective signals from leaking over into an adjoining diversity branch.

The invention claimed is:

1. A method comprising:
    receiving at each of at least two diversity antennas that are spaced apart and/or that have different polarizations and are included in a tower mounted amplifier unit (TMA), a radio frequency (RF) signal transmitted from the same transmitter, where each RF signal received at each of the spaced apart diversity antennas is at the same frequency and carries the same information;
    converting in the TMA one or more of the received diversity antenna signals into a corresponding number of different frequency signals by mixing with a first set of a corresponding number of reference signals;
    band pass filtering each converted diversity antenna signal using a respective band pass filter included in the TMA;
    combining in the TMA each band pass filtered diversity antenna signal and an amplified non-converted received diversity antenna signal into a composite signal;
    band pass filtering the composite signal using another band pass filter included in a duplexer of the TMA;
    forwarding the band pass filtered composite signal on a single external feeder to a radio base station such that a number of feeders required between the radio base station and the TMA is reduced; and
    diversity processing the forwarded composite signal to obtain a single enhanced received signal corresponding to the transmitted signal.

2. The method recited in claim 1, wherein the TMA comprises n antennas, said method comprising the steps of:
    converting all received antenna signals except one, and
    combining the non-converted antenna signal together with all frequency-converted signals to provide n-way diversity with the single external feeder.

3. The method recited in claim 1, further comprising: converting the frequency-converted signals to other frequencies by mixing them with a second set of reference signals in order to obtain another set of frequency-converted signals which are forwarded to the base station as part of the band pass filtered composite signal on the single external feeder.

4. The method recited in claim 1, further comprising the steps of:

converting one of the received antenna signals on into an intermediate (IF) signal at a non-used frequency, and combining the IF signal together with an amplified non-converted antenna signal to provide 2-way diversity with the single external feeder.

5. The method recited in claim 1, wherein the TMA includes two diversity antenna arrangements, one comprising a first and a second antenna, the other comprising a third and fourth antenna, said method comprising the steps of:

converting the RF signals from the second and fourth antennas into first and second intermediate frequency (IF) signals, both of the same intermediate frequency;

combining an amplified non-converted antenna signal on the first antenna together with the first IF signal and forwarding on a first external feeder to the radio base station; and combining an amplified non-converted antenna signal on the third antenna together with the second IF signal and forwarding on a second external feeder to the radio base station, thus providing 4-way diversity with two external feeders.

6. The method recited in 1, further comprising the steps of:

converting, at the radio base station, one or more of frequency-converted signals into other frequency-converted signals, all on the same intermediate frequency, by mixing them with a set of reference signals, and subjecting the twice frequency converted signals on the common intermediate frequency to the diversity processing.

7. A receiver diversity antenna arrangement, comprising:

a tower mounted amplifier unit (TMA) including at least two diversity antennas that are spaced apart and/or that have different polarizations, each of the diversity antennas being adapted for reception of radio frequency (RF) signal transmitted from the same transmitter, where each RF signal received at each of the spaced apart diversity antennas is at the same frequency and carries the same information;

one or more frequency converters in the TMA each adapted to convert a respective one of the diversity antenna signals to a respective, different frequency signal by mixing it with a corresponding reference frequency;

one or more band pass filters in the TMA for respectively band pass filtering each converted diversity antenna signal;

a combiner in the TMA for combining each band pass filtered diversity antenna signal and an amplified non-converted received diversity antenna signal to form a composite signal;

a band pass filter included in a duplexer of the TMA for band pass filtering the composite signal;

a single feeder external to the TMA and coupled to a radio base station for forwarding the band pass-filtered composite signal to the radio base station; and a diversity processor in the radio base station for diversity processing the forwarded composite signal to obtain an enhanced received signal corresponding to the transmitted signal.

8. The receiver diversity antenna arrangement recited in claim 7, wherein a signal from each diversity antenna follows a respective diversity branch, the TMA further comprising a frequency converter in each diversity branch except one.

9. The receiver diversity antenna arrangement recited in claim 7, wherein the TMA includes a second set of frequency converters adapted to convert the frequency-converted signals into another set of frequency-converted signals for transport to the radio base station as part of the band pass filtered composite signal on the single external feeder.

10. The receiver diversity antenna arrangement recited in claim 7, further comprising:

a single frequency converter converting the antenna signal from one of the diversity antennas to a non-used intermediate frequency within a full receiver band to form an IF signal, wherein the combiner is configured to combine the received signal from another of the diversity antennas with the IF signal into the composite signal to provide 2-way diversity with the signal external feeder.

11. The receiver diversity antenna arrangement recited in claim 7, further comprising:

two diversity antenna arrangements which together include four antennas, each of the two diversity antenna arrangements comprising a respective single external feeder, thereby providing 4-way diversity with the two external feeders.

12. A site comprising a radio base station coupled to at least one tower-mounted unit (TMA) via a single feeder and including a receiver diversity antenna arrangement according to claim 7.

13. A method comprising:

receiving at each of at least two diversity antennas that are spaced apart and/or that have different polarizations and are included in a tower mounted amplifier unit (TMA), a radio frequency (RF) signal transmitted from the same transmitter, where each RF signal received at each of the diversity antennas is at the same frequency and carries the same information;

converting in the TMA each of the received diversity antenna signals into a corresponding number of different frequency signals by mixing with a first set of a corresponding number of reference signals;

band pass filtering each converted diversity antenna signal using a respective band pass filter included in the TMA;

combining in the TMA the filtered diversity antenna signals into a composite signal;

band pass filtering the composite signal using another band pass filter included in a duplexer of the TMA;

forwarding the band pass filtered composite signal on a single external feeder to a radio base station such that a number of feeders required between the radio base station and the TMA is reduced; and diversity processing the forwarded composite signal to obtain a single enhanced received signal corresponding to the transmitted signal.

14. The method recited in claim 13, wherein the TMA comprises n antennas, said method comprising converting all received antenna signals and combining them to provide n-way diversity with the single external feeder.

15. The method recited in claim 13, further comprising:

converting the frequency-converted signals to other frequencies by mixing them with a second set of reference signals in order to obtain another set of frequency-converted signals which are combined into the composite signal and forwarded to the radio base station on the single external feeder.

16. The method recited in claim 13, further comprising the step of converting, at a frequency converter connected between the TMA and the radio base station, the composite signal.

17. A receiver diversity antenna arrangement, comprising:

a tower mounted amplifier unit (TMA) including at least two diversity antennas that are spaced apart and/or that have different polarizations, each of the diversity antennas being adapted for reception of radio frequency (RF) signal transmitted from the same transmitter, where each RF signal received at each of the spaced apart diversity antennas is at the same frequency and carries the same information;

one or more frequency converters in the TMA each adapted to convert a respective one of the diversity antenna signals to a respective, different frequency signal by mixing it with a corresponding reference frequency;

one or more band pass filters in the TMA for respectively band pass filtering each converted diversity antenna signal;

a combiner in the TMA for combining all of the band pass filtered diversity antenna signals into a composite signal;

a further band pass filter included in a duplexer of the TMA for band pass filtering the composite signal;

a single feeder external to the TMA and coupled to a radio base station for forwarding the band pass-filtered, composite signal to the radio base station; and a diversity processor in the radio base station for diversity processing the forwarded composite signal to obtain an enhanced received signal corresponding to the transmitted signal.

18. The receiver diversity antenna arrangement recited in claim 17, wherein a signal from each diversity antenna follows a respective diversity branch, the TMA further comprising a frequency converter in each diversity branch.

19. The receiver diversity antenna arrangement recited in claim 17, where the frequency converters are configured to convert their respective diversity antenna signals to a non-used intermediate frequency within a full receiver band to form multiple IF signals provided to the combiner.

20. A site comprising a radio base station, connected to at least one tower-mounted unit (TMA) of a receiver diversity antenna arrangement according to claim 17.

21. The site according to claim 20, further comprising:
a frequency converter connected provided between the TMA of the receiver diversity antenna arrangement and the radio base station, the frequency converter adapted to convert the composite signal outputted from the TMA on the single external feeder.

* * * * *

UNITED STATES PATENT AND TRADEMARK OFFICE
CERTIFICATE OF CORRECTION

| | | |
|---|---|---|
| PATENT NO. | : 8,064,958 B2 | Page 1 of 1 |
| APPLICATION NO. | : 10/598678 | |
| DATED | : November 22, 2011 | |
| INVENTOR(S) | : Skarby et al. | |

It is certified that error appears in the above-identified patent and that said Letters Patent is hereby corrected as shown below:

On the Title Page, in Item (54), in "Title", in Column 1, Line 3, delete "DIVERSITY DIVERSITY" and insert -- DIVERSITY --, therefor.

In Column 1, Line 3, delete "DIVERSITY DIVERSITY" and insert -- DIVERSITY --, therefor.

In Column 7, Line 23, in Claim 6, delete "in 1," and insert -- in claim 1, --, therefor.

Signed and Sealed this
Twelfth Day of June, 2012

David J. Kappos
*Director of the United States Patent and Trademark Office*